A. N. ANDERSON & F. W. FRANK.
BLOW-OFF VALVE.
APPLICATION FILED FEB. 7, 1910.
980,392.
Patented Jan. 3, 1911.
2 SHEETS—SHEET 1.
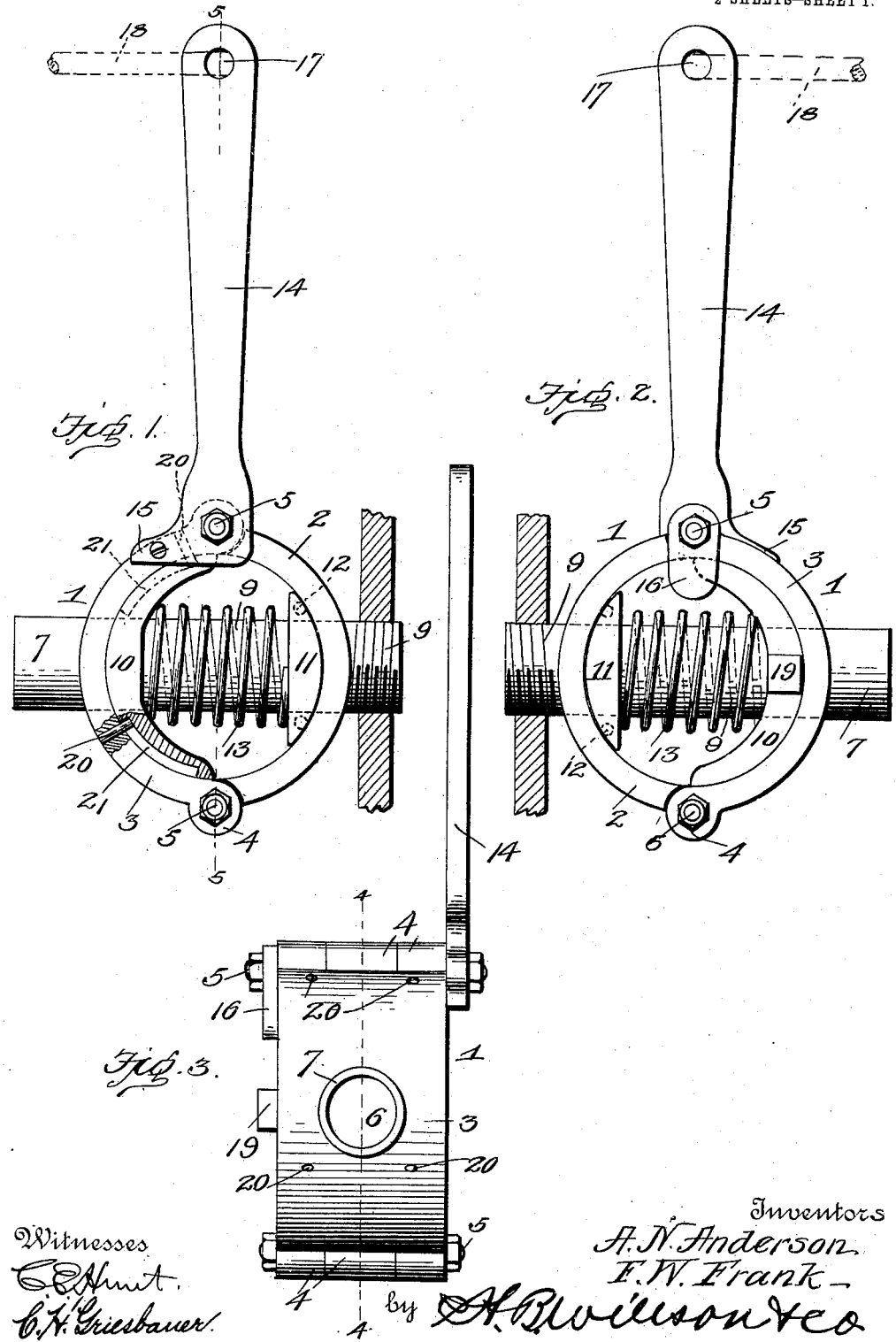

A. N. ANDERSON & F. W. FRANK.
BLOW-OFF VALVE.
APPLICATION FILED FEB. 7, 1910.
980,392.
Patented Jan. 3, 1911.
2 SHEETS—SHEET 2.
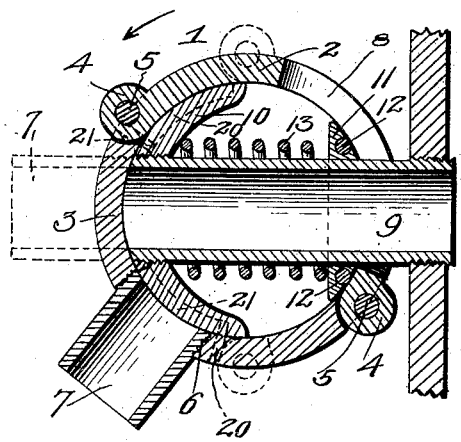
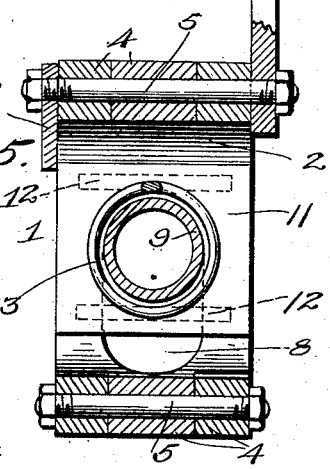
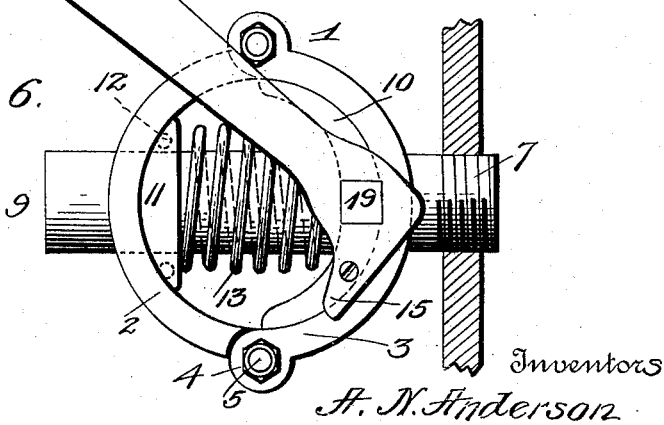

UNITED STATES PATENT OFFICE.

ANTHONY NICHOLAS ANDERSON, OF ALBANY, GEORGIA, AND FREDERICK W. FRANK, OF WILKES-BARRE, PENNSYLVANIA.

BLOW-OFF VALVE.

980,392.  Specification of Letters Patent.  Patented Jan. 3, 1911.

Application filed February 7, 1910. Serial No. 542,396.

*To all whom it may concern:*

Be it known that we, ANTHONY N. ANDERSON, a citizen of the United States, residing at Albany, Dougherty county, Georgia, and FREDERICK W. FRANK, a citizen of the United States, residing at Wilkes-Barre, in the county of Luzerne and State of Pennsylvania, have invented certain new and useful Improvements in Blow-Off Valves; and we do declare the following to be a full, clear, and exact description of the invention, such as will enable others skilled in the art to which it appertains to make and use the same.

This invention relates to improvements in blow-off valves for steam boilers.

The object of the invention is to improve the construction of valves of this character whereby they will be more efficient and reliable in use and may be readily operated from a distant point.

With the foregoing and other objects in view, the invention consists of certain novel features of construction, combination and arrangement of parts as will be more fully described and particularly pointed out in the appended claims.

In the accompanying drawings, Figure 1 is an end view of one end of the valve showing the same applied to a boiler; Fig. 2 is a similar view of the opposite end; Fig. 3 is a side view; Fig. 4 is a sectional view on the line 4—4 of Fig. 3; Fig. 5 is a similar view on the line 5—5 of Fig. 1; Fig. 6 is an end view similar to Fig. 2 showing a modified arrangement of the valve wherein the casing is connected to the boiler and the operating handle connected to the valve to move the latter instead of the casing as shown in the first figures of the drawings.

In the embodiment of our invention, we provide a suitable casing 1 formed of two semi-circular sections 2 and 3. The sections 2 and 3 are provided on their opposite ends with interlocking apertured ears 4 which are connected together by suitable pins or bolts 5. In the side of the section 3 of the casing is formed a steam discharge port 6 with which is connected a discharge nipple 7.

In the section 2 of the casing is formed a slot 8 through which projects the discharge tube 9. The tube 9 extends into and across the casing 1 and has connected to its inner end a segmental valve plate 10 which is adapted to fit against and to have a sliding steam tight engagement with the inner side of the casing opposite to the slot 8 whereby, when the casing is turned in one direction or the other, the port 6 in this side of the casing will be brought into and out of alinement with the adjacent end of the discharge tube 9 which joins and passes through the valve 10 as shown.

On the tube 9 opposite to the valve plate 10 is arranged a segmental washer plate 11 in the curved outer face of which are preferably mounted anti-friction rollers 12 which are adapted to bear against the adjacent inner wall of the casing to permit the latter to turn freely when actuated to open and close the valve. On the tube 9 between the valve plate 10 and washer plate 11 is arranged a stiff coiled spring 13, the pressure of which is exerted to force the valve plate into tight frictional engagement with the adjacent wall of the casing, whereby a fluid tight connection is formed between the parts. In order to operate the valve, a suitable handle 14 is provided, the latter being shown in the first figures of the drawings as being connected to one end of one of the fastening bolts or pins 5 of the casing, said handle also being provided with a lateral extension or spur 15, which is secured to the adjacent end of the casing by a fastening screw or bolt as shown.

On the opposite end of the pin or bolt 5 to which the handle is connected is arranged a retaining plate or washer 16, which projects beyond the inner edge of the casing and serves to hold the valve against lateral movement in this direction, said valve being held against lateral movement in the opposite direction by the projecting inner portion of the handle as shown. In the upper end of the handle is formed an aperture 17 to which may be connected an operating rod 18, whereby the valve may be opened and closed at any suitable point. By forming the valve as herein shown and described, it will be readily seen that as the discharge tube 9 is screwed in and fastened to the boiler, the valve will be rigidly held and that in turning the casing in one direction or the other by the operating rod and handle, the discharge port and tube therein will be brought into and out of alinement with the adjacent end of the discharge tube 9 which projects through the valve 10, thereby opening and closing the discharge port.

In Fig. 6 of the drawings, the arrangement of the valve is shown as being reversed or, in other words, the tube or nipple 7 of the casing is screwed into the boiler, thus readily holding the casing in place. In this arrangement of the valve, the handle, instead of being attached to the casing as hereinbefore described, is attached to the valve plate 10 by means of a suitable lug or projection 19 formed on one side thereof and adapted to receive the handle as shown. When the handle is applied to this end of the valve, the handle will hold the parts against lateral movement in this direction and when the handle is thus arranged, the retaining plate or washer 16 is removed from this end of the bolt and placed upon the opposite end thereby holding the parts against lateral movement in this direction. When the casing is thus rigidly held and the handle applied to the valve, it will be readily understood that the valve is moved instead of the casing to open and close the discharge port.

In order to further hold the valve and casing against lateral movement and to guide the same in their rotary or turning movements, we preferably provide dowel pins 20, which are inserted through one side of the casing and into engagement with the segmental grooves 21 formed in the adjacent edge of the valve, whereby the valves and casing are firmly held against any lateral movement and are guided in their respective movements upon each other.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described our invention, what we claim is:—

1. A blow-off valve comprising a casing having formed in one side a discharge port, a valve having arranged therethrough a discharge port, a tube connected with said port and projecting through the opposite side of the casing, and means whereby the port and discharge tube in said valve and casing are brought into and out of alinement, and means on the tube for holding said valve in fluid tight engagement with the inner wall of said casing.

2. In a blow-off valve, a casing having formed in one side a slot and in its opposite side a discharge port, a discharge nipple connected with said discharge port, a valve arranged in said casing, a discharge tube connected with said valve and having its opposite end projecting through the slot in said casing, a washer arranged on said discharge tube and adapted to bear against the side of the casing opposite to said valve, and a spring arranged on the tube between said washer and valve whereby the latter is held in fluid tight engagement with the adjacent wall of the casing.

3. In a blow-off valve, a casing having formed in one side a slot and in its opposite side a discharge port, a nipple arranged in said port, a segmental valve adapted to bear against the inner side of the casing adjacent to the discharge port therein, said valve having formed therein a discharge port adapted to be brought into and out of alinement with the port in the casing to open and close the valve, a discharge tube connected with the port in said valve and projecting through the slot in the opposite side of the casing, a washer arranged on said tube at the opposite side of the casing from the valve, anti-frictional rollers arranged in said washer and adapted to bear against the adjacent wall of the casing, a spring arranged on said tube between said washer and valve whereby the latter is held in fluid tight engagement with the adjacent wall of the casing, and a handle adapted to operate said parts whereby the port in said valve is brought into and out of alinement with the discharge port in the casing.

4. In a valve of the character described, a casing having formed in one side a discharge port and in its opposite side a slot, a valve arranged in said casing over the discharge port therein, said valve having a discharge port, a tube connected with the port in said valve and projecting through the slot in the casing, the projecting end of said tube being adapted to be connected with a boiler, whereby the valve is rigidly held, a washer arranged on said tube and adapted to bear against the side of the casing opposite to the valve, a spring arranged between said washer and valve to hold the latter in fluid tight engagement with the casing, a handle connected to the valve casing whereby the latter is turned to bring the discharge port therein into and out of engagement with the discharge port in said valve, and dowel pins arranged in said casing and valve whereby said parts are guided and limited in their movement.

In testimony whereof we have hereunto set our hands in presence of two subscribing witnesses.

ANTHONY NICHOLAS ANDERSON.
FRED. W. FRANK.

Witnesses to the signature of A. N. Anderson:
G. W. ROBERTS,
W. H. NALL, Jr.

Witnesses to the signature of F. W. Frank:
JOHN FRANK,
CASPER HAUCK.